United States Patent
Namiki

(10) Patent No.: US 10,146,818 B2
(45) Date of Patent: Dec. 4, 2018

(54) COMPUTING SYSTEM

(71) Applicant: NEC Corporation, Minato-ku, Tokyo (JP)

(72) Inventor: Yuta Namiki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 350 days.

(21) Appl. No.: 14/775,779

(22) PCT Filed: Feb. 19, 2014

(86) PCT No.: PCT/JP2014/000843
§ 371 (c)(1),
(2) Date: Sep. 14, 2015

(87) PCT Pub. No.: WO2014/141594
PCT Pub. Date: Sep. 18, 2014

(65) Prior Publication Data
US 2016/0026666 A1    Jan. 28, 2016

(30) Foreign Application Priority Data
Mar. 15, 2013  (JP) .................................. 2013-053392

(51) Int. Cl.
G06F 17/30  (2006.01)

(52) U.S. Cl.
CPC .... *G06F 17/30336* (2013.01); *G06F 17/3033* (2013.01); *G06F 17/30327* (2013.01); *G06F 17/30424* (2013.01)

(58) Field of Classification Search
CPC ......... G06F 17/30336; G06F 17/30321; G06F 17/30613
See application file for complete search history.

(56) References Cited

U.S. PATENT DOCUMENTS

| | | | | |
|---|---|---|---|---|
| 5,495,608 | A * | 2/1996 | Antoshenkov .... | G06F 17/30474 |
| 6,366,904 | B1 * | 4/2002 | BenHadda ........ | G06F 17/30395 |
| | | | | 707/700 |
| 8,380,701 | B1 * | 2/2013 | Konik ............... | G06F 17/30336 |
| | | | | 707/713 |

FOREIGN PATENT DOCUMENTS

| | | |
|---|---|---|
| JP | 05-094475 A | 4/1993 |
| JP | 09-305619 A | 11/1997 |
| JP | 2006-227715 A | 8/2006 |
| JP | 2010-044763 A | 2/2010 |

OTHER PUBLICATIONS

Junichi Tatemura, Oliver Po, Wang-Pin Hsiung, and Hakan Hacigumus. 2012.Partiqle: an elastic SQL engine over key-value stores. In Proceedings of the 2012 ACM SIGMOD International Conference on Management of Data.

Pouria Pirzadeh, Junichi Tatemura, Hakan Hacigumus, "Performance Evaluation of Range Queries in Key Value Stores," 2012 IEEE 26th International Parallel and Distributed Processing Symposium Workshops & PhD Forum, pp. 1092-1101.

(Continued)

*Primary Examiner* — Hung Q Pham

(57) ABSTRACT

A computing system includes a database and a processing device. The database includes a data part which stores data and an index part which stores an incomplete index of the data. The processing device receives a query from a client, processes a query by using the incomplete index, and transmits a response to the query to the client.

7 Claims, 12 Drawing Sheets

(56) References Cited

OTHER PUBLICATIONS

Satoshi Yamato, Miwaku no Net Tool Dai 10 Kai MSN Search Toolbar de Kensaku Kankyo o Kyoka suru, PC Japan, vol. 10, No. 8, Aug. 1, 2005 (Aug. 1, 2005), pp. 144 to 147 Cited in ISR.
Kabushiki Kaisha Assist, Database Jigyobu Eigyo Gijutsubu Professional Serviceka,Pro ga Oshieru Performance Tuning Jissen Tutorial, DB Magazine, the August issue, Aug. 1, 1999 (Aug. 1, 1999), pp. 126 to 131 Cited in ISR.
International Search Report for PCT Application No. PCT/JP2014/000843, dated Mar. 25, 2014.
Nobumasa Sato, You can try immediately! Windows Ultimate TIPS, Nikkei Win PC, Japan, Nikkei Business Publications Ink., Jun. 1, 2005, vol. 11, No. 8, pp. 114-115.
Japanese Office Action for JP Application No. 2015-505254 dated Nov. 1, 2016 with English Translation.

\* cited by examiner

| ID | NAME | ADDRESS | PRODUCT | PURCHASE NUMBER |
|---|---|---|---|---|
| 1 | SUZUKI | TOKYO | AAA | 3 |
| 2 | SATO | SAITAMA | BBB | 10 |
| ⋮ | ⋮ | ⋮ | ⋮ | ⋮ |

(B)

| KEY | VALUE |
|---|---|
| 1 | (1,SUZUKI, TOKYO,AAA,3) |
| 2 | (2,SATO, SAITAMA,BBB,10) |
| ⋮ | ⋮ |

(C)

| KEY | VALUE |
|---|---|
| SATO | {2} |
| SUZUKI | {1} |
| ⋮ | ⋮ |

(A)

(B)

| KEY | VALUE |
|---|---|
| 1 | [2,SATO,3,TAKAHASHI,4] |
| 2 | [ABE,SATO] |
| 3 | [SUZUKI(D),TAKAHASHI] |
| 4 | [YAMAMOTO(D),WATANABE] |

FIG. 8

(A)
| KEY | VALUE |
|---|---|
| TABLE - NAME | {OLD INDEX (STATUS : CREATION COMPLETED)} |

(B)
| KEY | VALUE |
|---|---|
| TABLE - NAME | {OLD INDEX (STATUS : CREATION COMPLETED), NEW INDEX (STATUS : BEING CREATED)} |

(C)
| KEY | VALUE |
|---|---|
| TABLE - NAME | {OLD INDEX (STATUS : INVALID), NEW INDEX (STATUS : CREATION COMPLETED)} |

FIG. 9

| KEY | VALUE |
|---|---|
| OLD INDEX | NUMBER OF RECORDS : 200 |
| NEW INDEX | NUMBER OF RECORDS : 50 |

COMPUTING SYSTEM

This application is a National Stage Entry of PCT/JP2014/000843 filed on Feb. 19, 2014, which claims priority from Japanese Patent Application 2013-053392 filed on Mar. 15, 2013, the contents of all of which are incorporated herein by reference, in their entirety.

TECHNICAL FIELD

The present disclosure relates to a computing system, query processing method and program for processing a query from a client by using an index.

BACKGROUND

A computing system having a database creates an index to speed up processing of stored data, and also updates an index at the time of deletion and update of stored data and addition to stored data. An index which supports the entire index target data stored in the database is referred to as a complete index. On the other hand, an index whose data structure is not incomplete and which supports only part of the index target data is referred to as an incomplete index.

In relation to a computing system which processes a query from a client by using an index, it is proposed as a first related art relating to the present invention to select one of the following two processing methods when an index corresponding to a query is incomplete (see Patent Document 1, for example):
(1) abnormally end the query; and
(2) suspend processing of the query, execute an index creation process so that the index becomes complete, and then restart the suspended processing of the query.
Patent Document 1: Japanese Unexamined Patent Application Publication No. H5-094475
Non-Patent Document 1: Junichi Tatemura, Oliver Po, Wang-Pin Hsiung, and Hakan Hacigumus. 2012. Partiqle: an elastic SQL engine over key-value stores. In Proceedings of the 2012 ACM SIGMOD International Conference on Management of Data
Non-Patent Document 2: Pouria Pirzadeh, Junichi Tatemura, Hakan Hacigumus, "Performance Evaluation of Range Queries in Key Value Stores," 2012 IEEE 26th International Parallel and Distributed Processing Symposium Workshops & PhD Forum, pp. 1092-1101

In the case of using an incomplete index, it is difficult to obtain the same result as in the case of using a complete index, because an incomplete index supports a less amount of data. However, because the data structure of an incomplete index is not incomplete, processing does not break down even if an incomplete index is used for a query. Therefore, it may be more advantageous for a client in some cases to process a query immediately by using an incomplete index than abnormally end a query without exception or keep the client waiting long until an incomplete index becomes a complete index. However, the first related art relating to the present invention does not present any idea about processing a query by using an incomplete index as it is.

SUMMARY

A computing system as a first aspect of the present invention includes:
a database which has a data part storing data and an index part storing an incomplete index of the data; and
a processing device which receives a query from a client, processes the query by using the incomplete index, and transmits a response to the query to the client.

A query processing method as a second aspect of the present invention is a query processing method executed by a computing system including: a database having a data part storing data and an index part storing an incomplete index of the data; and a processing device,
wherein the processing device receives a query from a client, processes the query by using the incomplete index, and transmits a response to the query to the client.

Further, a computer program as a third aspect of the present invention includes instructions for causing a processor, which is connected to a database having a data part storing data and an index part storing an incomplete index of the data, to execute:
receiving a query from a client;
processing the query by using the incomplete index; and
transmitting a response to the query to the client.

BRIEF DESCRIPTION OF DRAWINGS

FIGS. 5A to 5C are diagrams showing an example of storage of tabular data as KV data and an example of an index;
FIGS. 8A to 8C are diagrams showing examples of the configuration of index information in the computing system according to an exemplary embodiment;
FIG. 9 is a diagram showing an example of the configuration of statistical information in the computing system according to an exemplary embodiment.

DETAILED DESCRIPTION

An object of the present invention is to provide a computing system which solves the abovementioned problem, that is, a problem that an incomplete index is not efficiently used.

The present invention enables efficient use of an incomplete index because a query from a client is processed by using an incomplete index.

Next, exemplary embodiments will be described in detail referring to the attached drawings.

First Exemplary Embodiment

Figure 1:
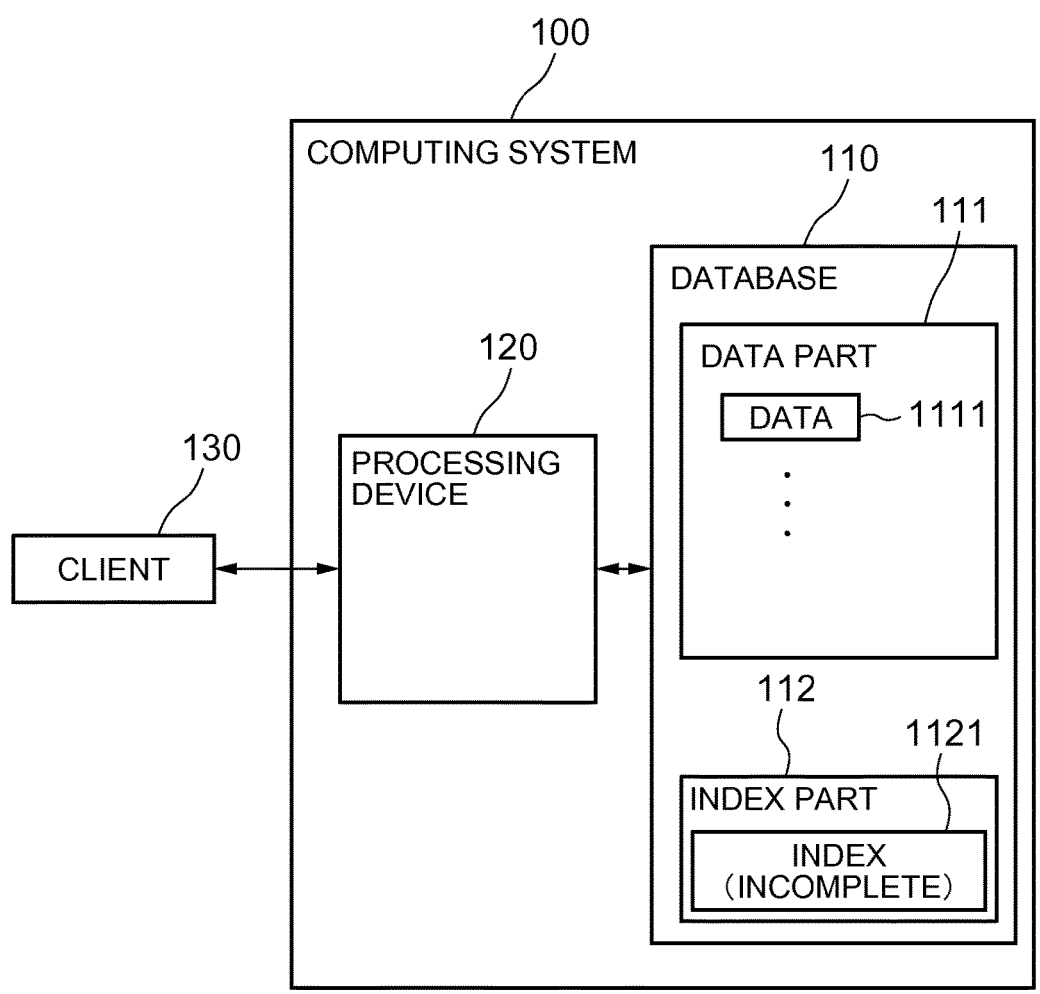
FIG. 1 is a block diagram of a computing system according to an exemplary embodiment.

Referring to FIG. 1, a computing system 100 according to a first exemplary embodiment includes a database 110 and a processing device 120. The database 110 may be any kind of database. For example, the database 110 may be a key-value store (KVS). Alternatively, the database 110 may be a relational database (RDB).

The database 110 includes a data part 111 and an index part 112. The data part 111 has a function of storing data 1111. The index part 112 has a function of storing an incomplete index 1121 of the data 1111. The incomplete index 1121 refers to an index whose data structure is not incomplete and which supports only index target data stored in the data part 111.

The processing device 120 has a function of receiving a query from a client 130, a function of processing the query by using the incomplete index 1121, and a function of transmitting a response to the query to the client 130. The processing device 120 generally includes a processor, a memory and a communication device, and executes given processing by executing a program stored in the memory.

Figure 2:
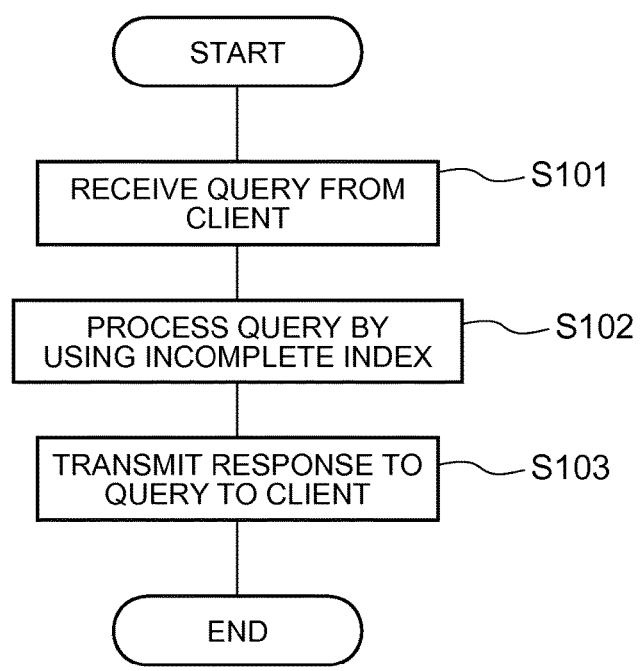
FIG. 2 is a flowchart showing the procedure of query processing in the computing system according to an exemplary embodiment.

FIG. 2 is a flowchart showing the procedure of query processing in this exemplary embodiment. Referring to FIG. 2, the operation in this exemplary embodiment will be described below.

The processing device 120 of the computing system 100 firstly receives a query transmitted from the client 130 through a network which is not shown in the drawings (step S101). Next, the processing device 120 accesses the data 1111 in the data part 111 by using the incomplete index 1121 stored in the index part 112, and thereby processes the received query (step S102). Then, the processing device 120 transmits the result of the processing as a response to the query to the client 130 (step S103).

Thus, according to this exemplary embodiment, efficient use of an incomplete index is possible because a query from the client 130 is processed by using the incomplete index 1121.

Modifications or variations as shown below can be made in this exemplary embodiment on the basis of the configuration and operation described above.

For example, the processing device 120 may have a function of determining the type of a query and, in a case where the determined type is not a predetermined type, not processing the query by using the incomplete index 1121. Alternatively, the processing device 120 may be configured to determine the type of a query, process the query by using the incomplete index 1121 only in a case where the determined type is a predetermined type, and make the query inexecutable otherwise. The predetermined type mentioned above may be a query which returns the result of any of aggregate functions MAX (the maximum value), MIN (the minimum value) and AVG (the average value). This is because processing of a query which focuses on a statistical tendency such as the maximum value, the minimum value or the average value makes it possible to obtain a result with a certain degree of accuracy by using part of the data 1111 stored in the data part 111 without using all the data 1111.

Further, the processing device 120 may have a function of analyzing user designation information included in a query and, in a case where use of the incomplete index 1121 is not allowed according to the user designation information, not processing the query by using the incomplete index 1121. Alternatively, the processing device 120 may be configured to analyze user designation information included in a query, process the query by using the incomplete index 1121 only in a case where use of the incomplete index 1121 is allowed according to the user designation information, and make the query inexecutable otherwise.

Further, the processing device 120 may have a function of calculating the degree of completion of the incomplete index 1121 and, in a case where the calculated degree of completion does not exceed a threshold, not processing the query by using the incompletion index 1121. Alternatively, the processing device 120 may be configured to calculate the degree of completion of the incomplete index 1121, process the query by using the incomplete index 1121 only in a case where the calculated degree of completion exceeds a threshold, and make the query inexecutable otherwise. As the degree of completion of the incomplete index 1121, the processing device 120 may use, for example, the number of the data 1111 already registered in the incomplete index 1121, or the ratio of the number of the data 1111 already registered in the incomplete index 1121 to the number of the data 1111 stored in the data part 111. Alternatively, in a case where the data part 111 is composed of a plurality of sub data parts, the processing device 120 may use, as the degree of completion of the incomplete index 1121, the number of sub data parts whose data are all registered in the incomplete index 1121 among the plurality of sub data parts, or the ratio of the number of sub data parts whose data are all registered in the incomplete index 1121 to the total number of the sub data parts.

Further, the processing device 120 may have a function of calculating the degree of completion of the incomplete index 1121 and the cost for accessing the data part 111 by using the incomplete index 1121, calculating an index value for selecting the incomplete index 1121 on the basis of the calculated degree of completion and cost and, in a case where the calculated index value is not better than a threshold, not processing the query by using the incomplete index 1121. Alternatively, the processing device 120 may be configured to process the query by using the incomplete index 1121 only in a case where the index value calculated as described above is better than a threshold, and make the query inexecutable otherwise. In a case where the incomplete index 1121 is an index having a tree structure, the processing device 120 may use the height of the tree structure as the cost described above. Moreover, in a case where the incomplete index 1121 is a new index which is being rebuilt so as to be used instead of an old index stored in the index part 112, the processing device 120 may calculate the degree of completion of the old index and the cost for accessing the data part 111 by using the old index, calculate an index value for selecting the old index on the basis of the calculated degree of completion and cost, and use the calculated index value as the threshold described above.

Further, in a case where the incomplete index 1121 exists or in a case where the incomplete index 1121 does not satisfy the desired condition described above, the processing device 120, instead of making the query inexecutable, may process the query by using the incomplete index 1121, calculate a prediction interval or a confidence interval on the basis of a statistical method and include it into a response. A confidence level may be any level such as 90% or 95%. For example, assuming a confidence level is 90% and a confidence interval is 20 to 30, the processing device returns a response "the confidence level is 90% and the result of the query is between 20 and 30," for example.

Second Exemplary Embodiment

Figure 3:
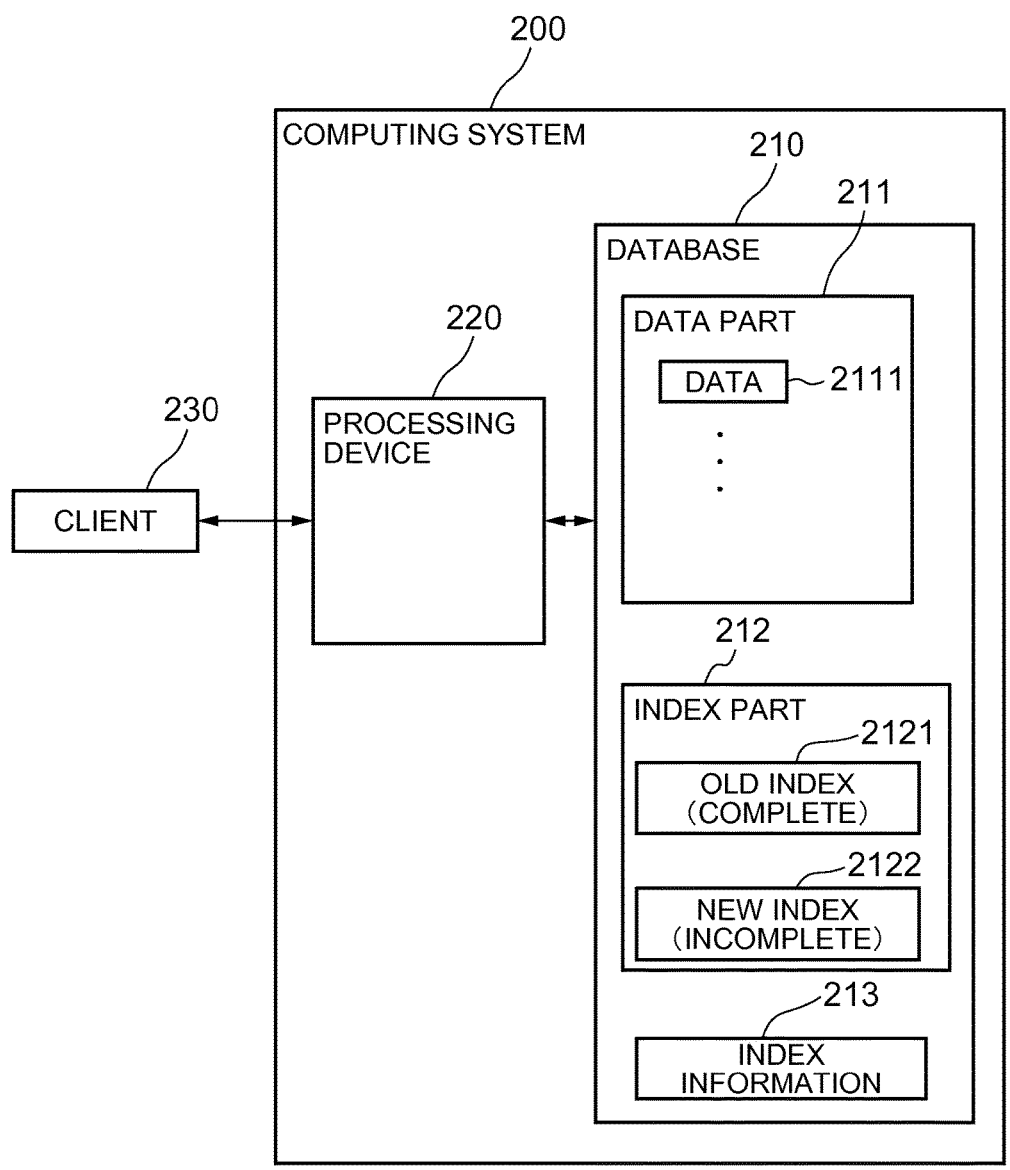
FIG. 3 is a block diagram of a computing system according to an exemplary embodiment.

Referring to FIG. 3, a computing system 200 according to a second exemplary embodiment includes a database 210 and a processing device 220. The database 210 may be any kind of database. For example, the database 210 may be a key-value store (KVS). Alternatively, the database 210 may be a relational database (RDB).

The database 210 includes a data part 211, an index part 212, and index information 213. The data part 211 has a function of storing data 2111. The index part 212 has a function of storing an old index 2121 as a complete index of the data 2111 and a new index 2122 as an incomplete index. The new index 2122 refers to an index whose data structure is not incomplete and in which only part of index target data stored in the data part 211 is registered. For example, the new index 2122 is an index which is being rebuilt so as to be used instead of the old index 2121 showing lowered access efficiency. The index information 213 represents management information about the old index 2121 and the new index 2122. The index information has information such as which table and column of the data 2111 the old index 2121 and the new index 2122 correspond, whether the new index 2122 is in the incomplete state, and whether the old index 2121 is still valid.

The processing device 220 has a function of receiving a query from the client 230, a function of determining whether or not to use the new index 2122 for processing of the received query, a function of processing the query by using the new index 2122 in the case of determining to use the new index 2122 and processing the query by using the old index 2121 in the case of determining not to use the new index 2122, and a function of transmitting a response to the query to the client 230. Moreover, the processing device 220 generally includes a processor, a memory and a communication device, and executes given processing by executing a program stored in the memory.

Figure 4:
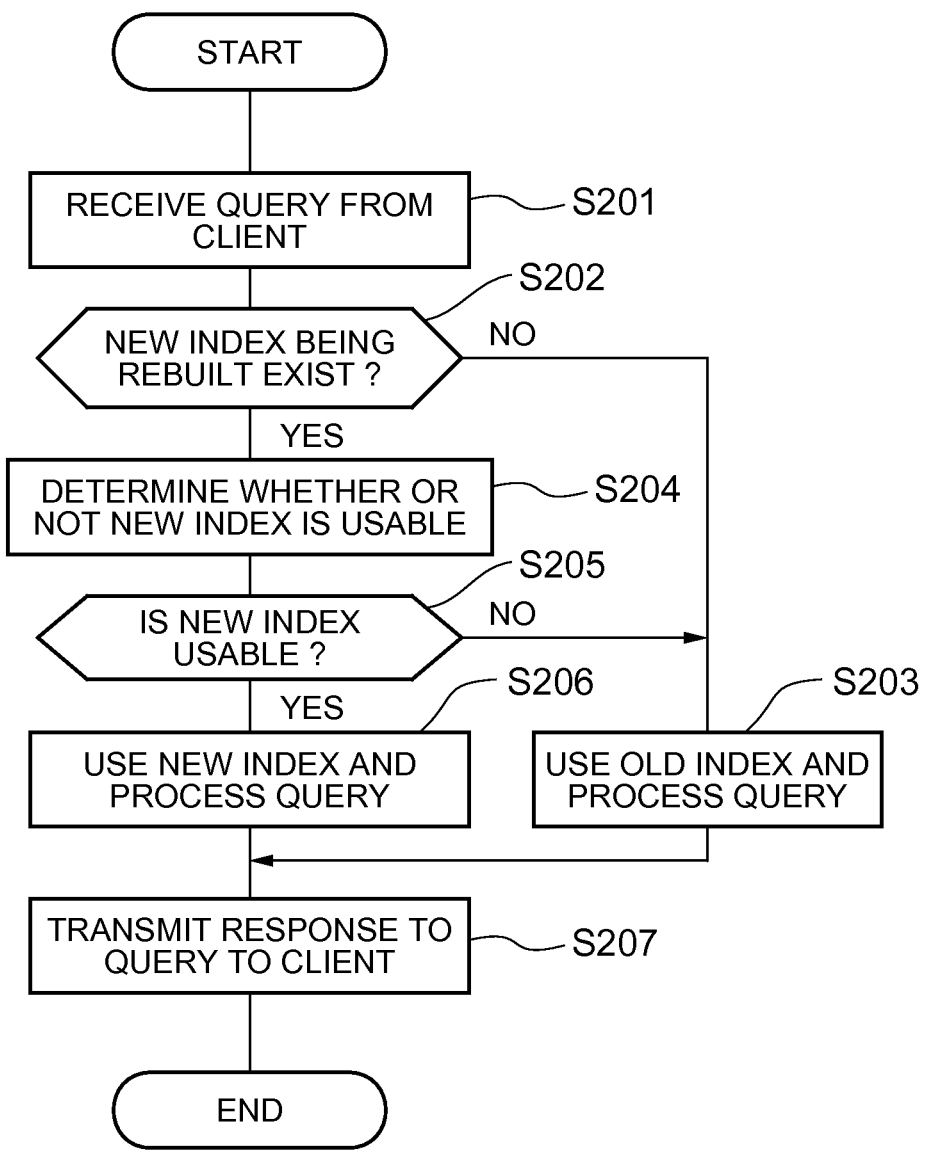
FIG. 4 is a flowchart showing the procedure of query processing in the computing system according to an exemplary embodiment.

FIG. 4 is a flowchart showing the procedure of query processing in this exemplary embodiment. Referring to FIG. 4, the operation in this exemplary embodiment will be described below.

The processing device 220 of the computing system 200 firstly receives a query transmitted from the client 230 through a network which is not shown in the drawings (step S201). Next, the processing device 220 refers to the index information 213, and determines whether or not the new index 2122 exists in indexes which can be used for processing the received query (step S202). In a case where the new index 2122 does not exist, the processing device 220 accesses the data 2111 of the data part 211 by using the old index 2121 stored in the index part 212, and thereby processes the received query (step S203). Then, the processing device 220 transmits the result of the processing as a response to the query to the client 230 (step S207).

On the other hand, in a case where the new index 2122 exists, the processing device 220 determines whether or not the new index 2122 is usable (step S204). For example, the processing device 220 determines that the new index 2122 is usable in a case where any one of the following conditions 1 to 4 is satisfied, and determines that the new index 2122 cannot be used otherwise. Alternatively, the processing device 220 determines that the new index 2122 is usable in a case where any two of the following conditions 1 to 4 are satisfied, and determines that the new index 2122 cannot be used otherwise. Alternatively, the processing device 220 determines that the new index 2122 is usable in a case where any three of the following conditions 1 to 4 are satisfied, and determines that the new index 2122 cannot be used otherwise. Alternatively, the processing device 220 determines that the new index 2122 is usable in a case where all the following conditions 1 to 4 are satisfied, and determines that the new index 2122 cannot be used otherwise.

Condition 1: The type of a query is a predetermined type.

The predetermined type may be, for example, aggregate functions MAX (the maximum value), MIN (the minimum value) and AVG (the average value). For example, a query like "SELECT c1, AVG (value) FROM t1 WHERE c2=3 GROUP BY c1" is found to be an aggregate function which returns AVG (the average value), on the basis of detection of a string AVG (value). Assuming a column c1 is a classification name or the like, this query focuses on a tendency, and it is probable that an accurate result is not requested necessarily. By determining in consideration of the condition 1 whether or not the new index 2122 is usable, it is possible to efficiently use the new index 2122 only for a query whose result does not largely differ from a result when using the old index 2121.

Condition 2: Use of the new index 2122 that is an incomplete index is allowed in user designation information included in a query.

By determining in consideration of the condition 2 whether or not the new index 2122 is usable, it is possible to have the user determine whether or not the new index 2122 is usable.

Condition 3: The degree of completion of the new index 2122 exceeds a threshold.

A method for calculating the degree of completion of the new index 2122 may be the same as the method for calculating the degree of completion of the incomplete index 1121 in the first exemplary embodiment. By determining in consideration of the condition 3 whether or not the new index 2122 is usable, it is possible to prevent use of the new index 2122 with an extremely low degree of completion immediately after start of rebuilding thereof.

Condition 4: An index value which is for selecting the new index 2122 and is calculated on the basis of the degree of completion of the new index 2122 and the cost for accessing the data part 211 by using the new index 2122 is better than a threshold. A method for calculating the abovementioned cost may be the same as the method for calculating the cost of the incomplete index 1121 in the first exemplary embodiment. Moreover, an index value calculated for the old index 2121 in the same manner as the index value for the new index 2122 may be used as the abovementioned threshold. By determining in consideration of the condition 4 whether or not the new index 2122 is usable, it is possible to prevent use of the new index 2122 with an extremely low degree of completion immediately after start of rebuilding thereof. Moreover, according to the method of using an index value calculated for the old index 2121 in the same manner as the index value for the new index 2122 as the abovementioned threshold, it is possible to select and use more favorable one, either the old index 2121 or the new index 2122, in terms of view of the degree of completion and the cost of usage when taken together.

Next, in the case of determining that the new index 2122 is not usable (NO at step S205), the processing device 220 processes the query by using the old index 2121 (step S203), and transmits the result of the processing as a response to the query to the client 230 (step S207).

On the other hand, in the case of determining that the new index 2122 is usable (YES at step S205), the processing device 220 accesses the data 2111 of the data part 211 by using the new index 2122 stored in the index part 212, and thereby processes the received query (step S206). Then, the processing device 220 transmits the result of the processing as a response to the query to the client 230 (step S207).

Thus, according to this exemplary embodiment, a query from the client 230 is processed by using the new index 2122 that is being rebuilt and incomplete, so that efficient use of an incomplete index is possible.

Further, according to this exemplary embodiment, it is determined whether or not the new index 2122 that is being rebuilt and incomplete is usable and, when the new index 2122 is not usable, it is possible to process a query from the client 230 by using the old index 2121.

Third Exemplary Embodiment

Next, a third exemplary embodiment will be described in detail. This exemplary embodiment applies the present invention to a distributed key-value store (referred to as KVS hereinafter). Therefore, firstly, a distributed KVS will be briefly described.

For storage of a huge amount of data, a distributed KVS has drawn attention recently. Voldemort (http://www.project-voldemort.com/) is one example of implementation thereof. In general, a KVS, for which scalability and throughput are important, is expected to expand a system from a configuration including a small number of nodes by adding a node as necessary, and process a number of concurrent requests on huge data.

However, because scalability is important for a KVS, data thereof must be expressed with a simple structure composed of key and value (this structure will be referred to as a key-value pair or a KV pair hereinafter), and atomic operations to which a KVS can respond are only "get," which is acquiring value with key of a KV pair designated, "put," which is storing a KV pair, and "delete," which is deleting a KV pair with key designated. Rebuilding of an index to be described later in this exemplary embodiment uses scanning of all the stored data, and this operation has some limitations.

On the other hand, for storage of data in a computer system, a relational database (referred to as RDB hereinafter) is widely used. A RDB has a flexible tabular data structure and many functions, but its scalability is limited. Microsharding is an attempt to realize management of tabular data of a RDB on a KVS and increase scalability (see Non-Patent document 1, for example). In Microsharding, all the data are expressed in the key-value format and stored into a KVS.

FIGS. 5A to 5C show an example of storage of tabular data (FIG. 5A) as KV data (FIG. 5B). Because a KVS basically allows only acquisition of a KV pair with the value of key designated, the value of any column in the table is used as key (in the example shown in FIGS. 5A to 5C, ID is used), and the values of all the columns in one row are stored in value as shown in FIGS. 5A to 5C. For example, the first row of the tabular data is stored as KV data having a key value of "1" and value of "1, Suzuki, Tokyo, AAA, 3." Thus, in order to access with the value of a column other than the key column, an external structure referred to as an index is needed. For example, for accessing with a name such as Sato or Suzuki, an index as shown in FIG. 5C is needed.

Figure 6:
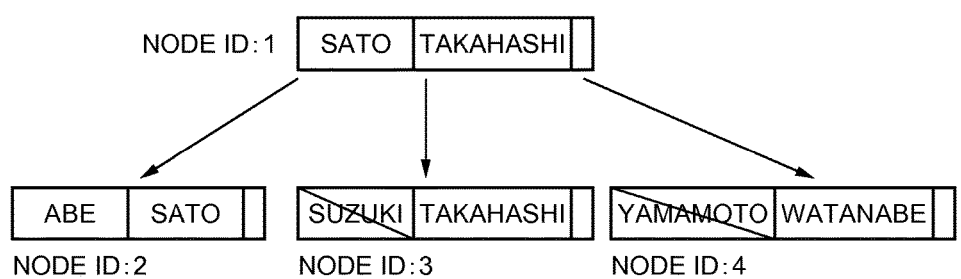
FIGS. 6A and 6B are diagrams showing an example of a B-tree index and an example of a hash index expressing the B-tree index with KV pairs.

In general, a single index structure is composed of a plurality of KV pairs. When a KV pair is expressed as "{key, value}," an index, such as the index shown in FIG. 5C, which represents an index in the format of {the value of an index target column, the value of key of original data} is referred to as a hash index. In a hash index, a KV pair is expressed in a KVS for each of the values of one search target column. On the other hand, there is an index of B-tree structure or similar thereto. FIGS. 6A and 6B show an example of a index having a B-tree structure (FIG. 6A) and an example of a hash index which expresses the B-tree index with KV pairs (FIG. 6B). In the B-tree index, each of the nodes forming the tree becomes a KV pair.

Once an index is built, the index needs to be rebuilt regularly. For example, regarding an operation of deleting an element in a B-tree, the deletion operation is usually completed simply by setting a deletion flag (a diagonal line indicates deletion in FIG. 6A, and "D" indicates deletion in FIG. 6B), because a B-tree supports the deletion operation but change of the structure of the tree is a high-cost operation. Thus, invalid data accumulate after deletion of elements is repeated, and access efficiency worsens due to increase of the height of the tree (=the depth of the hierarchy). Therefore, in order to increase performance, it is required to regularly rebuild an index. For example, in an Oracle Database, an index is rebuilt with the ALTER INDEX REBUILD syntax.

A KVS is used for storing a huge amount of data due to its scalability. It is indispensable to scan all index target data in order to rebuild an index and, in a case where a large amount of target data is stored as in a KVS, it takes much time to rebuild in fact. Solving a problem that an index which is being rebuilt is not efficiently used is an object of this exemplary embodiment.

Figure 7:
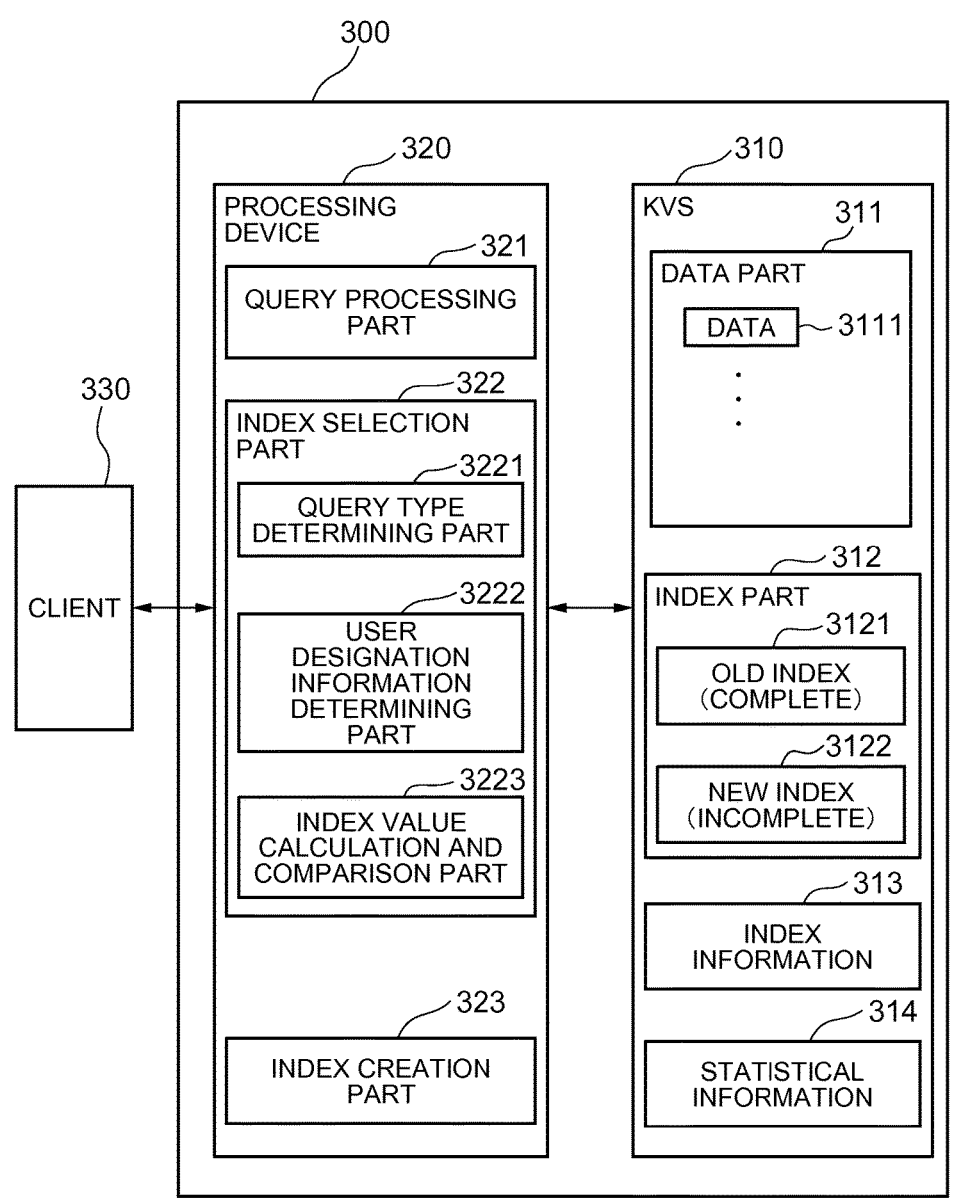
FIG. 7 is a block diagram of a computing system according to an exemplary embodiment.

Referring to FIG. 7, a computing system 300 according to this exemplary embodiment includes a KVS 310 and a processing device 320.

The KVS 310 includes a data part 311, an index part 312, index information 313, and statistical information 314.

The data part 311 has a function of storing data 3111. The data 3111 is user data created by the user. Each data 3111 has content and format like KV data shown in FIG. 5B, for example.

The index part 312 has a function of storing an old index 3121 which is a complete index of the data 3111 and a new index 3122 which is an incomplete index being rebuilt. The new index 3122 refers to an index whose data structure is not incomplete and in which the entire index target data stored in the data part 311 is not registered but part of the data is registered.

The index information 313 is a KV pair which manages information of a valid index. FIGS. 8A to 8C show an example of the configuration of the index information 313. As key of the KV pair forming the index information 313, a string representing a table and a column which an index managed by the index information 313 relates to is recorded. For example, as for the index information 313 corresponding to the index shown in FIG. 5B, a combination of a string for identifying tabular data and a string for identifying a column of name is the value of key as shown in FIGS. 8A to 8C. On the other hand, as value of the KV pair forming the index information 313, information for identifying a valid index is recorded. For example, in a state that the new index 3122 which is being built does not exist and the old index 3121 exists, information for identifying the old index and a status thereof (creation completed) are recorded as value as shown in FIG. 8A. Further, when creation of the new index 3122 is started, in addition to the information about the old index 3121, information for identifying the new index 3122 and a status thereof (being created) are recorded as value as shown in FIG. 8B. Furthermore, when creation of the new index 3122 is completed and the old index 3121 is no longer necessary, the status of the old index 3121 is made to be "invalid" and the status of the new index 3122 is made to be "creation completed" as shown in FIG. 8C.

The statistical information 314 is data which stores various kinds of information such as the number of records registered in the new index 3122. FIG. 9 shows an example of the configuration of the statistical information 314. The statistical information 314 of this example is composed of a KV pair in which the number of records registered in the old index 3121 is recorded and a KV pair in which the number of records registered in the new index 3122 is recorded. As key of each KV pair, information which specifies the old index 3121 or the new index 3122 is recorded. Moreover, as value of the KV pair relating to the old index 3121, the number of data registered in the old index 3121 is recorded. As value of the KV pair relating to the new index 3122, the number of data registered in the new index 3122 is recorded.

In general, the KVS 310 is built with a plurality of nodes (computers), and KV pairs stored in the KVS 310 are distributed and stored in the plurality of nodes. Therefore, the KV pairs composing the respective data 3111 in the data part 311, the KV pairs composing the old index 3121 and the new index 3122 in the index part 312, the KV pairs composing the index information 313, and the KV pairs composing the statistical information 314 are distributed and stored in the plurality of nodes.

The processing device 320 has a processor such as a MPU and peripheral circuits such as a memory and a communication device, and has a function of causing the processor to load and execute a program stored in the memory and thereby making the hardware and the program work in cooperation and realizing various processing parts. Major processing parts realized by the processing device 320 are a query processing part 321, an index selection part 322, and an index creation part 323.

The query processing part 321 has a function of receiving a query from the client 330 through a network which is not shown in the drawings, processing the query, and transmitting a response thereto to the client 330. In order to determine an index for processing a query, the query processing part 321 notifies the received query to the index selection part 322, and processes the query by using the index determined by the index selection part 322.

The index selection part 322 has a function of determining an index to be used for processing of a query received from the query processing part 321 and notifying the index to the query processing part 321. To be specific, firstly, the index selection part 322 refers to the index information 313 and determines candidates of an index to be used for query processing. Next, in a case where the new index 3122 in the being-created status is included in the candidates of the index, the index selection part 322 determines whether the new index 3122 is usable by using a query type determining part 3221, a user designation information determining part 3222 and an index value calculation and comparison part 3223. In the case of determining the new index 3122 is usable, the index selection part 322 notifies the new index 3122 to the query processing part 321. On the contrary, in the case of determining the new index 3122 is not usable, the index selection part 322 notifies the old index 3121 to the query processing part 321.

The query type determining part 3221 determines the type of a query and, in a case where the type is not a predetermined type, determines the new index 3122 is not usable. The predetermined type includes, for example, queries which return the results of aggregate functions MAX (the maximum value), MIN (the minimum value) and AVG (the average value).

The user designation information determining part 3222 analyzes user designation information included in a query and, in a case where allowance of use of the new index 3122 is not written in the user designation information, determines the new index 3122 is not usable.

The index value calculation and comparison part 3223 calculates an index value relating to the new index 3122 and, in a case where the calculated index value is not better than a threshold, determines the new index 3122 is not usable. An index value relating to an index is calculated by using the following equation, for example. According to this calculation method, a smaller index value is a better index value.

$$\text{Index value} = \text{cost of usage} + \alpha(1 - \text{degree of completion of index}) \quad (1)$$

In the equation 1, cost of usage is the cost for accessing data of the data part 311 by using an index. For example, in the case of a B-tree index, the height of the tree (the depth of the hierarchy) can be cost of usage. Moreover, completion of index is the degree of completion of an index, and takes a value from 0 to 1 (the degree of completion gets higher as the value gets close to 0). Degree of completion of index is calculated by using the following equation, for example.

$$\text{Degree of completion of index} = \text{number of records existing in index at present/number of index target records} \quad (2)$$

In the case of the new index 3122, as number of records existing in index at present, the value of value of the new index KV pair in the statistical information 314 shown in FIG. 9 is used. Moreover, in the case of the new index 3122, as number of index target records, the value of value of the old index KV pair in the statistical information 314 shown in FIG. 9 is used.

In the equation 1, a is a weight coefficient of cost of usage and degree of completion of index. If it is desired to give more importance to the degree of completion of index than cost of usage, a is set to be a larger value. Otherwise, a is set to be a smaller value.

The index creation part 323 has a function of rebuilding an index. Below, rebuilding of an index will be described.

A KVS is generally characterized by its ability to process with high throughput when a number of clients connect thereto at a time, and needs to allow clients to access consistent information even during rebuilding of an index. For the purpose of providing consistent information, for example, it is possible to store all the information of an index into a single KV pair which ensures an atomic operation. However, because of performance disadvantages such as increase of a transfer time due to increase of the size of the KV pair, the need for a process of searching for a target element because a large amount of elements are included, and the need for storage of all the elements when even one element is rewritten, this method is not practical. Therefore, one index structure is generally composed of a plurality of KV pairs as stated before. In other words, in a hash index, a KV pair is expressed on a KVS for each value of one search target column. Further, in a B-tree index, each of the nodes configuring the tree is a KV pair.

When a plurality of KV pairs compose one index, it becomes a problem that atomic update can be executed only on a single KV pair in a KVS. In general, a KVS is structured with a plurality of nodes (a node in this case is not a node for composing the tree stated above but a computer or the like), and KV pairs stored in the KVS are distributed and managed in a state that which node each of the KV pairs is stored in is not known from outside the KVS. Therefore, atomic update is executed limitedly on one KV pair. Just making each node of an index (a node in this case is a node of the tree) a KV pair may allow another client to refer to the tree which is being updated and half-finished during execution of an operation on the index. This problem can be solved by the structure and procedure as described in Non-Patent Document 2 if the index structure is the B-tree structure, for example. The index creation part 323 performs rebuilding of an index with the system as described in Non-Patent Document 2, thereby preventing occurrence of a problem even when the new index 3122 which is being rebuilt and half-finished is used.

Further, the index creation part 323 sequentially acquires (scans) the data 3111 from the data part 311 of the KVS 310, and, in a case where the acquired data is index target data, adds a reference to the data to the new index 3122 that is being rebuilt, and also updates the statistical information 314. The statistical information 314 does not need to be updated for each record necessarily. For example, the statistical information 314 may be updated every time ten records are registered in an index.

Furthermore, in the case of creating the new index 3122 to be newly used instead of the old index 3121 in a state that only the old index 3121 exists, the index creation part 323 changes the index information 313 from the state as shown in FIG. 8A to the state as shown in FIG. 8B. Moreover, when finishing creation of the new index 3122, the index creation part 323 changes the index information 313 from the state as shown in FIG. 8B to the state as shown in FIG. 8C. As described before, because the index information 313 is one KV pair, update of the index information 313 is performed by a CAS (Compare And Swap) operation. Consequently, it is possible to atomically perform switch from a state that only an old index exists to a state that both an old index and a new index exist, or switch from a state that both an old index and a new index exist to a state that only a new index exists.

Next, the operation of the computing system 300 according to this exemplary embodiment will be described. Firstly, the operation when receiving a query from the client 330 will be described referring to flowcharts shown in FIGS. 10 and 11.

Figure 10:
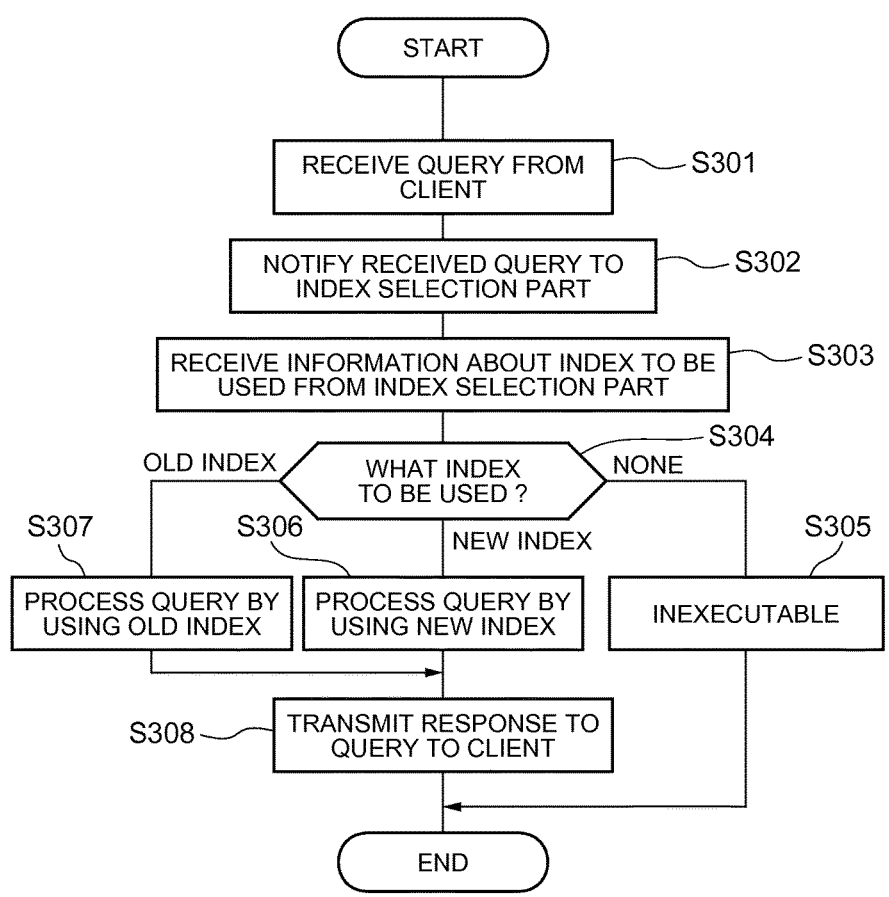
FIG. 10 is a flowchart showing an example of processing by a query processing part in the computing system according to an exemplary embodiment.

The query processing part 321 of the processing device 320 of the computing system 320 firstly receives a query transmitted from the client 330 through a network which is not shown in the drawings (step S301 of FIG. 10). Next, for selection of an index to be used for processing of the received query, the query processing part 321 notifies the received query to the index selection part 322 (step S302).

Figure 11:
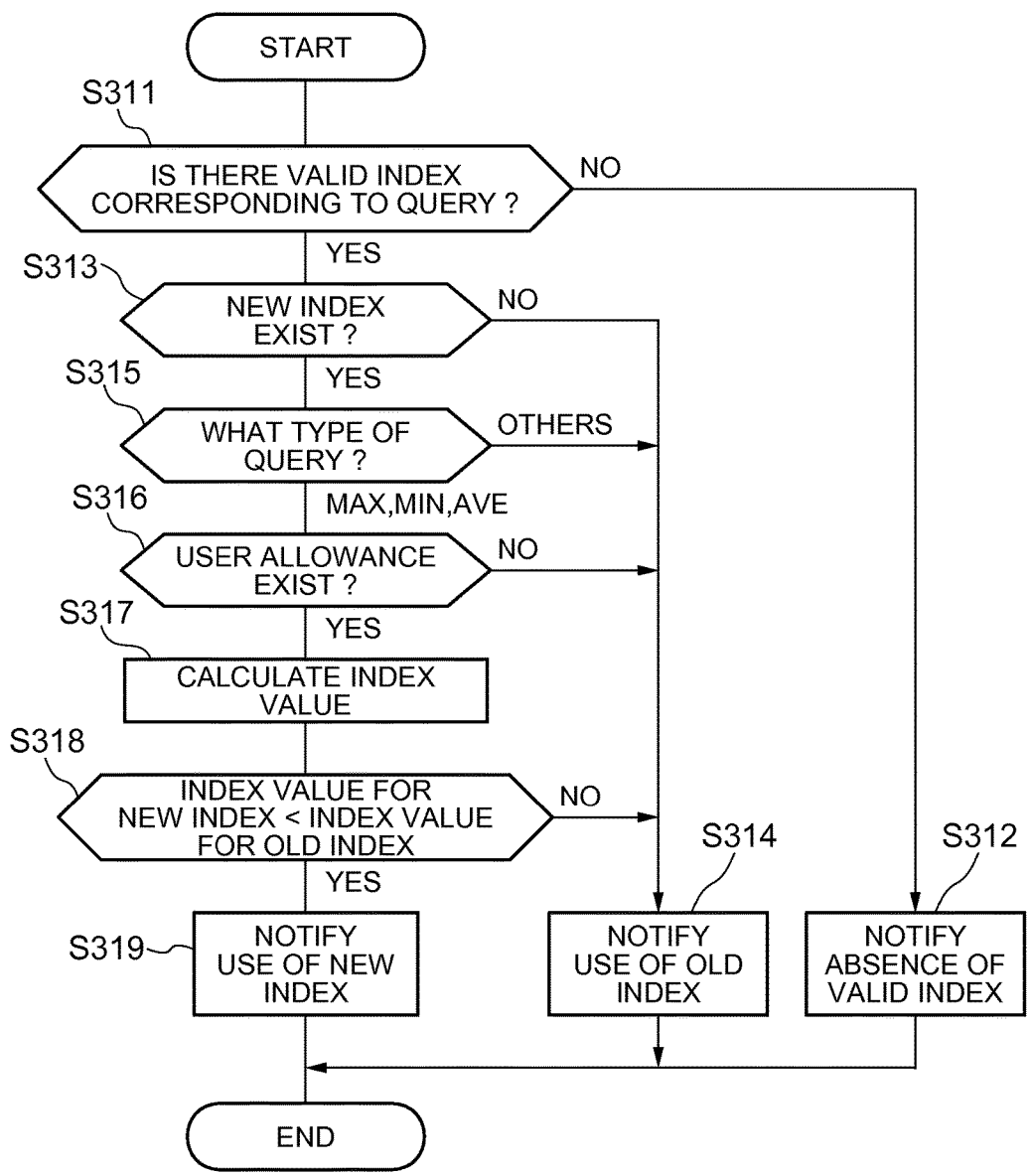
FIG. 11 is a flowchart showing an example of processing by an index selection part in the computing system according to an exemplary embodiment.

The index selection part 322 analyzes the query received from the query processing part 321, and checks whether or not there is a valid index for the query by referring to the index information 313 (step S311 of FIG. 11). An index for a query is, for example, in a case where a query is like "SELECT*FROM t1 WHERE c2=3" expressed in SQL, which is a standard language for a query to a database, an index for a column which becomes key in acquisition of data from a KVS in processing of the query, such as column c2 of table t1. It can be distinguished by the value of key of the index information 313 which table and which column an index relating to the index information 313 is for. Therefore, depending on whether or not it is possible to acquire the index information 313 corresponding to a key value determined by the column c2 of the table t1, it is possible to check whether or not there is an index. Moreover, an expression that an index is valid is that a status "invalid" is not recorded in the index information 313. In a case where there is not a valid index for the query, the index selection part 322 notifies it to the query processing part 321 (step S312). As mentioned before, basically, in order to acquire data from a KVS, there is no method other than designating key and acquiring data. Therefore, data needs to be stored in a KVS with a column like c2 as key from the first or, in a case where another column is key, an index needs to be prepared. Accordingly, in a case where a valid index does not exist, the query is inexecutable as described later.

On the other hand, in a case where a valid index for the query exists, the index selection part 322 further refers to the acquired index information, and checks whether or not there is the new index 3122 whose status is "being created" (step S313). In a case where the new index 3122 does not exist, the index selection part 322 notifies the old index 3121 recorded in the index information 313 to the query processing part 321 (step S314). On the other hand, in a case where the new index 3122 exists, the index selection part 322 determines whether or not to use the new index 3122 in the following manner (steps S315 to S318).

Firstly, the index selection part 322 determines the type of the query by using the query type determining part 3221 (step S315). In a case where the query is not the type returning the result of any of aggregate functions MAX (the maximum value), MIN (the minimum value) and AVG (the average value), the index selection part 322 determines not to use the new index 3122, and notifies the old index 3121 recorded in the index information 313 to the query processing part 321 (step S314).

In a case where the query is the type returning the result of any of aggregate functions MAX (the maximum value), MIN (the minimum value) and AVG (the average value), the index selection part 322 determines whether or not user designation information allowing use of the new index 3122 that is incomplete and being rebuilt is written in the query, by using the user designation information determining part 3222 (step S316). In a case where the query does not contain a given string or the like allowing use of the new index 3122, the index selection part 322 determines not to use the new index 3122, and notifies the old index 3121 recorded in the index information 313 to the query processing part 321 (step S314).

In a case where use is allowed by the user designation information, the index selection part 322 uses the index value calculation and comparison part 3223 to calculate an index value of the new index 3122 by using the equation 1 described above (step S317), and compares this calculated index value with an index value calculated for the old index 3121 by using the equation 1 described above (step S318). In a case where the index value for the new index 3122 is not lower than the index value for the old index 3121 (that is, in a case where the index value for the new index 3122 is equal to or more than the index value for the old index 3121), the index selection part 322 determines not to use the new index 3122, and notifies the old index 3121 recorded in the index information 313 to the query processing part 321 (step S314). On the contrary, in a case where the index value for the new index 3122 is lower than the index value for the old index 3121 (that is, in a case where the index value for the new index 3122 is less than the index value for the old index 3121), the index selection part 322 determines to use the new index 3122, and notifies the new index 3122 recorded in the index information 313 to the query processing part 321 (step S319).

Upon receiving information relating to an index to be used from the index selection part 322 (step S303 of FIG. 10), the query processing part 321 analyzes the information. In the case of receiving information that a valid index to be used does not exist from the index selection part 322, the query processing part 321 determines that the currently received query is inexecutable, and transmits an error message or the like to the client 330 (steps S304 and S305).

On the other hand, when receiving information of the new index 3122 as an index to be used from the index selection part 322, the query processing part 321 processes the query by using the new index 3122 (steps S304 and S306). On the other hand, when receiving information of the old index 3121 as an index to be used from the index selection part 322, the query processing part 322 processes the query by using the old index 3121 (steps S304 and S307). Then, the query processing part 321 transmits the result of the processing as a response to the query to the client 330 (step S308).

Figure 12:
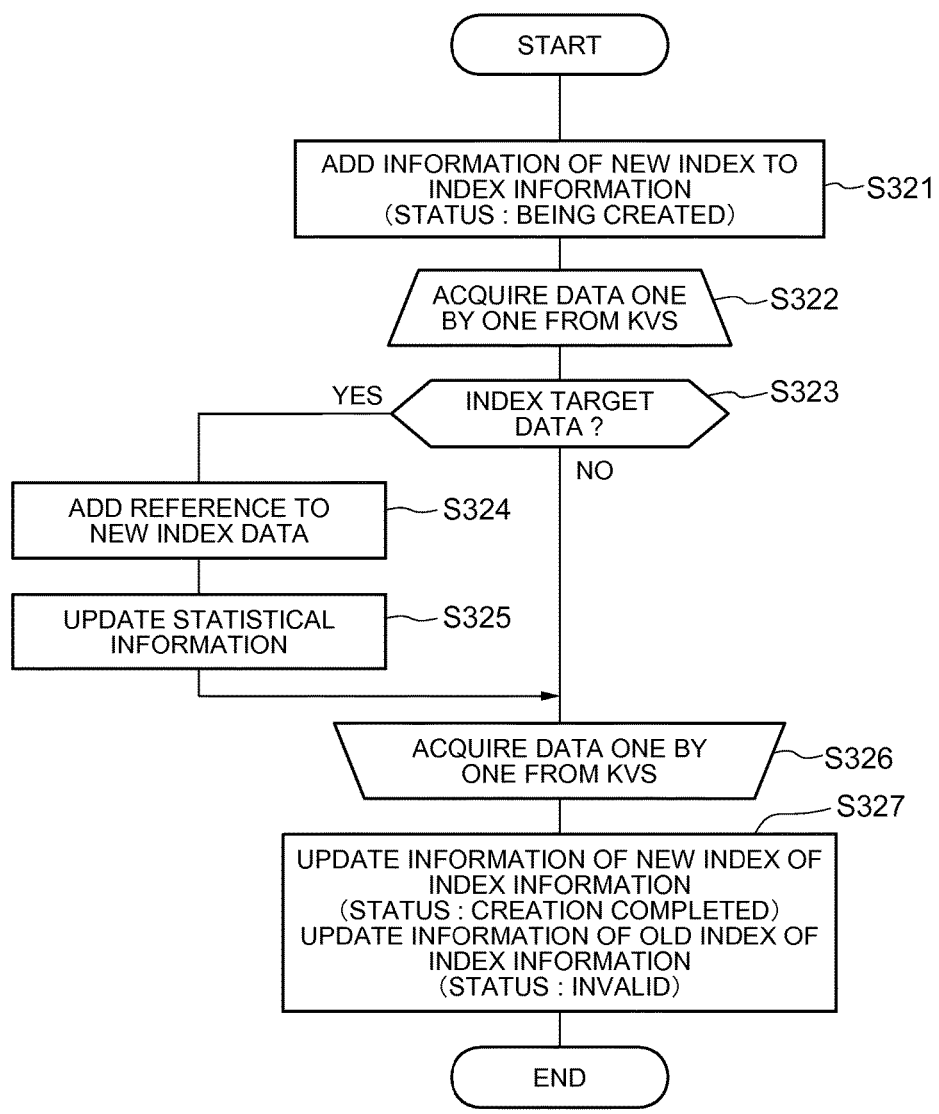
FIG. 12 is a flowchart showing an example of processing by an index creation part in the computing system according to an exemplary embodiment.

Next, the operation relating to creation of the new index 3122 by the index creation part 323 will be described referring to a flowchart shown in FIG. 12.

The index creation part 323 firstly adds information of the new index 3122 to the index information 313 which manages index information of the old index 3121, and changes the index information 313 from the state as shown in FIG. 8A to the state as shown in FIG. 8B (step S321).

Next, the index creation part 323 sequentially acquires the data 3111 one by one from the data part 311 of the KVS 310, and executes the following processes (steps S322 to S326). Firstly, the index creation part 323 determines whether or not the acquired data 3111 is index target data (step S323) and, in a case where the acquired data 3111 is not index target data, goes to processing of the next data 3111. In a case where the acquired data 3111 is index target data, the index creation part 323 adds a reference to the data 3111 to the new index 3122 (step S324). Next, the index creation part 323 updates the statistical information 314 corresponding to the new index 312 (step S325). Then, the index creation part 323 goes to processing of the next data 3111.

Upon finishing the processing of all the data 3111 of the data part 311 of the KVS 310, the index creation part 323 updates information of the index information 313, and changes the index information 313 from the state shown in FIG. 8B to the state shown in FIG. 8C (step S327).

The operation of the index creation part 323 described above is based on the premise that there is a function of full scan of internal data in the KVS 310. In general, such a function is implemented as a management function and does not ensure the consistency of data acquired during scan. Therefore, there is a case where, regarding data acquired during full scan, update of one data at certain time is reflected but update of another data at the same time is not reflected. Therefore, in order to structure a consistent index, it is necessary to make an index creation target object still (inhibit update). However, a query without update can be executed.

Thus, according to this exemplary embodiment, because a query from the client 330 is processed by using the new index 3122 which is incomplete and is being rebuilt, effective use of an incomplete index is enabled.

Further, according to this exemplary embodiment, it is determined whether or not the new index 3122 which is being rebuilt and incomplete can be used and, in a case where the index cannot be used, a query from the client 330 can be processed by using the old index 3121.

Furthermore, according to this exemplary embodiment, it is possible at the time of finishing creation of the new index 3122 to atomically switch from a state that both the old index 3121 and the new index 3122 are used to a state that only the new index 3122 is used.

Various modifications or variations may be made in this exemplary embodiment as shown below on the basis of the configuration and operation described above.

The query processing part 321, the index selection part 322 and the index creation part 323 do not need to exist on the same processing device 320, and may exist on the different processing devices 320.

Further, a B-tree index and a hash index have been illustrated as the structures of the indexes 3121 and 3122, but an index to which the present invention is directed is not limited thereto and may have another structure.

Furthermore, data stored in the KVS 310 is not limited to tabular data to which Microsharding is directed, and may include data which can be expressed in the key-value format in common and an index thereof.

Additionally, on the basis that a KVS is generally composed of a plurality of nodes, the number of nodes that building of an index for data is completed may be recorded as the statistical information 314, and the following equation may be used as an equation for finding the degree of completion of an index:

degree of completion of index=number of nodes completed/total number of nodes  (3)

The present invention is based upon and claims the benefit of priority from Japanese patent application No. 2013-053392, filed on Mar. 15, 2013, the disclosure of which is incorporated herein in its entirety by reference.

INDUSTRIAL APPLICABILITY

The present invention can be used for a computing system which processes a query from a client by using an index. To be specific, the present invention can be used for a KVS.

The whole or part of the exemplary embodiments disclosed above can be described as, but not limited to, the following supplementary notes.

(Supplementary Note 1)

A computing system comprising:

a database which has a data part storing data and an index part storing an incomplete index of the data; and a processing device which receives a query from a client, processes the query by using the incomplete index, and transmits a response to the query to the client.

(Supplementary Note 2)

The computing system according to Supplementary Note 1, wherein the processing device determines a type of the query and, in a case where the determined type is not a predetermined type, does not execute processing of the query using the incomplete index.

(Supplementary Note 3)

The computing system according to Supplementary Note 1 or 2, wherein the processing device analyzes user designation information included in the query and, in a case where use of the incomplete index is not allowed in the user designation information, does not execute processing of the query using the incomplete index.

(Supplementary Note 4)

The computing system according to any of Supplementary Notes 1 to 3, wherein the processing device calculates a degree of completion of the incomplete index and, in a case where the calculated degree of completion does not exceed a threshold, does not execute processing of the query using the incomplete index.
(Supplementary Note 5)
The computing system according to any of Supplementary Notes 1 to 3, wherein the processing device calculates a degree of completion of the incomplete index and a cost of accessing the data part by using the incomplete index, calculates an index value for selecting the incomplete index on a basis of the calculated degree of completion and the calculated cost and, in a case where the calculated index value is not better than a threshold, does not execute processing of the query using the incomplete index.
(Supplementary Note 6)
The computing system according to any of Supplementary Notes 1 to 5, wherein:
the index part stores an old index which is a compete index;
the incomplete index is a new index which is being rebuilt to be used instead of the old index; and
in a case of not executing processing of the query using the incomplete index, the processing device processes the query by using the old index and transmits a response to the query to the client.
(Supplementary Note 7)
The computing system according to Supplementary Note 6, wherein the processing device sequentially refers to the data stored in the data part, updates the new index to an index with a higher degree of completion and, upon finishing updating the new index to a complete index, invalidates the old index.
(Supplementary Note 8)
The computing system according to Supplementary Note 6 or 7, wherein:
the old index and the new index have a same identification name;
the database has index information which stores information about the old index and information about the new index while associating both the information with the index name; and
the processing device determines whether or not a valid index for the query exists and whether or not the old index corresponding to the new index is valid, by referring to the index information.
(Supplementary Note 9)
The computing system according to any of Supplementary Notes 1 to 8, wherein the database is a key-value store.
(Supplementary Note 10)
The computing system according to Supplementary Note 2, wherein the predetermined type is any of aggregate functions MAX (a maximum value), MIN (a minimum value) and AVG (an average value).
(Supplementary Note 11)
The computing system according to Supplementary Note 4 or 5, wherein in calculation of the degree of completion of the incomplete index, the processing device uses either a number of the data already registered in the incomplete index or a ratio of a number of the data already registered in the incomplete index to a number of the data stored in the data part.
(Supplementary Note 12)
The computing system according to Supplementary Note 4 or 5, wherein in calculation of the degree of completion of the incomplete index, in a case where the data part is composed of a plurality of sub data parts, the processing device uses either a number of the sub data parts whose all data are registered in the incomplete index among the plurality of sub data parts or a ratio of a number of the sub data parts whose all data are registered in the incomplete index to a total number of the sub data parts.
(Supplementary Note 13)
The computing system according to Supplementary Note 5, wherein in calculation of the cost, in a case where the incomplete index is an index having a tree structure, the processing device uses a height of the tree structure.
(Supplementary Note 14)
The computing system according to Supplementary Note 5, wherein in a case where the incomplete index is a new index which is being rebuilt so as to be used instead of an old index stored in the index part, the processing device calculates a degree of completion of the old index and a cost of accessing the data part by using the old index, calculates an index value for selecting the old index on a basis of the calculated degree of completion and the calculated cost, and sets the calculated index value as the threshold.
(Supplementary Note 15)
A query processing method executed by a computing system, the computing system including a database having a data part storing data, an index part storing an incomplete index of the data, and a processing device, the method comprising:
receiving a query from a client;
processing the query by using the incomplete index; and
transmitting a response to the query to the client.
(Supplementary Note 16)
The query processing method according to Supplementary Note 15, wherein
the processing includes determining a type of the query and, in a case where the determined type is not a predetermined type, no executing processing of the query using the incomplete index.
(Supplementary Note 17)
The query processing method according to Supplementary Note 15 or 16, wherein
the processing includes analyzing user designation information included in the query and, in a case where use of the incomplete index is not allowed in the user designation information, no executing processing of the query using the incomplete index.
(Supplementary Note 18)
The query processing method according to any of Supplementary Notes 15 to 17, wherein
the processing includes calculating a degree of completion of the incomplete index and, in a case where the calculated degree of completion does not exceed a threshold, no executing processing of the query using the incomplete index.
(Supplementary Note 19)
The query processing method according to any of Supplementary Notes 15 to 17, wherein
the processing includes calculating a degree of completion of the incomplete index and a cost of accessing the data part by using the incomplete index, calculating an index value for selecting the incomplete index on a basis of the calculated degree of completion and the calculated cost and, in a case where the calculated index value is not better than a threshold, no executing processing of the query using the incomplete index.
(Supplementary Note 20)
The query processing method according to any of Supplementary Notes 15 to 19, wherein:
the index part stores an old index which is a compete index;

the incomplete index is a new index which is being rebuilt to be used instead of the old index; and the processing includes, in a case of not executing processing of the query using the incomplete index, processing the query by using the old index and transmitting a response to the query to the client.

(Supplementary Note 21)

The query processing method according to Supplementary Note 20, wherein the processing includes sequentially referring to the data stored in the data part, updating the new index to an index with a higher degree of completion and, upon finishing updating the new index to a complete index, invalidating the old index.

(Supplementary Note 22)

The query processing method according to Supplementary Note 20 or 21, wherein:

the old index and the new index have a same identification name;

the database has index information which stores information about the old index and information about the new index while associating both the information with the index name; and the processing includes determining whether or not a valid index for the query exists and whether or not the old index corresponding to the new index is valid, by referring to the index information.

(Supplementary Note 23)

The query processing method according to any of Supplementary Notes 15 to 22, wherein the database is a key-value store.

(Supplementary Note 24)

The query processing method according to Supplementary Note 16, wherein the predetermined type is any of aggregate functions MAX (a maximum value), MIN (a minimum value) and AVG (an average value).

(Supplementary Note 25)

The query processing method according to Supplementary Note 18 or 19, wherein the processing includes, in calculation of the degree of completion of the incomplete index, using either a number of the data already registered in the incomplete index or a ratio of a number of the data already registered in the incomplete index to a number of the data stored in the data part.

(Supplementary Note 26)

The query processing method according to Supplementary Note 18 or 19, wherein the processing includes, in calculation of the degree of completion of the incomplete index, in a case where the data part is composed of a plurality of sub data parts, using either a number of the sub data parts whose all data are registered in the incomplete index among the plurality of sub data parts or a ratio of a number of the sub data parts whose all data are registered in the incomplete index to a total number of the sub data parts.

(Supplementary Note 27)

The query processing method according to Supplementary Note 19, wherein the processing includes, in calculation of the cost, in a case where the incomplete index is an index having a tree structure, using a height of the tree structure.

(Supplementary Note 28)

The query processing method according to Supplementary Note 19, wherein the processing includes, in a case where the incomplete index is a new index which is being rebuilt so as to be used instead of an old index stored in the index part, calculating a degree of completion of the old index and a cost of accessing the data part by using the old index, calculating an index value for selecting the old index on a basis of the calculated degree of completion and the calculated cost, and setting the calculated index value as the threshold.

(Supplementary Note 29)

A computer program comprising instructions for causing a processor, which is connected to a database having a data part storing data and an index part storing an incomplete index of the data, to execute:

receiving a query from a client;

processing the query by using the incomplete index, and transmitting a response to the query to the client.

What is claimed is:

1. A computing system comprising:
a database which has a data part storing data, an index part storing an old index which is a complete index of the data and an incomplete new index which is being rebuilt, index information which stores a state of the new index and a state of the old index, and statistical information which stores a number of records registered in the new index and a number of records registered in the old index; and
a processing device which receives a query from a client, determines which of the new index and the old index is used for processing the query, processes the query according to the determination, and transmits a response to the query to the client, wherein
when determining which of the new index and the old index is used, the processing device performs analysis of a type of the query, analysis of user designation information included in the query, calculation of an index value of the new index, calculation of an index value of the old index, and comparison between the index value of the new index and the index value of the old index,
in the calculation of the index value of the new index, the processing device calculates a first cost required for accessing the data part by using the new index, calculates a degree of completion of the new index on a basis of a ratio of the number of records of the data registered in the new index to the number of records of the data stored in the data part, and calculates the index value of the new index from the first cost and the degree of completion of the new index,
in the calculation of the index value of the old index, the processing device calculates a second cost required for accessing the data part by using the old index, calculates a degree of completion of the old index on a basis of a ratio of the number of records of the data registered in the old index to the number of records of the data stored in the data part, and calculates the index value of the old index from the second cost and the degree of completion of the old index, and
the processing device determines to use the new index in a case where the type of the query is any of aggregate functions MAX (a maximum value), MIN (a minimum value), and AVG (an average value), use of the new index is allowed in the user designation information, and the index value of the new index is larger than the index value of the old index, while the processing device determines to use the old index in other cases.

2. The computing system according to claim 1, wherein the processing device sequentially refers to the data stored in the data part, updates the new index to an index with a higher degree of completion and, upon finishing updating the new index to a complete index, invalidates the old index.

3. The computing system according to claim 1, wherein:
the old index and the new index have a same identification name;
the index information of the database stores information about the old index and information about the new index while associating both the information with the index name; and
the processing device determines whether or not a valid index for the query exists and whether or not the old index corresponding to the new index is valid, by referring to the index information.

4. The computing system according to claim 1, wherein the database is a key-value store.

5. The computing system according to claim 1, wherein in a case where the new index is an index having a tree structure, the processing device calculates the first cost on a basis of a height of the tree structure as the cost.

6. A query processing method executed by a computing system, the computing system including a database having a data part storing data, an index part storing an old index which is a complete index of the data and an incomplete new index which is being rebuilt, index information which stores a state of the new index and a state of the old index, and statistical information which stores a number of records registered in the new index and a number of records registered in the old index, and a processing device, the method comprising:
receiving a query from a client;
determining which of the new index and the old index is used for processing the query;
processing the query according to the determination;
transmitting a response to the query to the client; and
when determining which of the new index and the old index is used, performing analysis of a type of the query, analysis of user designation information included in the query, calculation of an index value of the new index, calculation of an index value of the old index, and comparison between the index value of the new index and the index value of the old index, wherein
the calculation of the index value of the new index includes calculating a first cost required for accessing the data part by using the new index, calculating a degree of completion of the new index on a basis of a ratio of the number of records of the data registered in the new index to the number of records of the data stored in the data part, and calculating the index value of the new index from the first cost and the degree of completion of the new index,
the calculation of the index value of the old index includes calculating a second cost required for accessing the data part by using the old index, calculating a degree of completion of the old index on a basis of a ratio of the number of records of the data registered in the old index to the number of records of the data stored in the data part, and calculating the index value of the old index from the second cost and the degree of completion of the old index, and
the new index is determined to be used in a case where the type of the query is any of aggregate functions MAX (a maximum value), MIN (a minimum value), and AVG (an average value), use of the new index is allowed in the user designation information, and the index value of the new index is larger than the index value of the old index, while the old index is determined to be used in other cases.

7. A non-transitory computer-readable medium storing a computer program comprising instructions for causing a processor, which is connected to a database having a data part storing data, an index part storing an old index which is a complete index of the data and an incomplete new index which is being rebuilt, index information which stores a state of the new index and a state of the old index, and statistical information which stores a number of records registered in the new index and a number of records registered in the old index, to execute:
receiving a query from a client;
determining which of the new index and the old index is used for processing the query;
processing the query according to the determination;
transmitting a response to the query to the client; and
when determining which of the new index and the old index is used performing analysis of a type of the query, analysis of user designation information included in the query, calculation of an index value of the new index, calculation of an index value of the old index, and comparison between the index value of the new index and the index value of the old index, wherein
the calculation of the index value of the new index includes calculating a first cost required for accessing the data part by using the new index, calculating a degree of completion of the new index on a basis of a ratio of the number of records of the data registered in the new index to the number of records of the data stored in the data part, and calculating the index value of the new index from the first cost and the degree of completion of the new index,
the calculation of the index value of the old index includes calculating a second cost required for accessing the data part by using the old index, calculating a degree of completion of the old index on a basis of a ratio of the number of records of the data registered in the old index to the number of records of the data stored in the data part, and calculating the index value of the old index from the second cost and the degree of completion of the old index, and
the new index is determined to be used in a case where the type of the query is any of aggregate functions MAX (a maximum value), MIN (a minimum value), and AVG (an average value), use of the new index is allowed in the user designation information, and the index value of the new index is larger than the index value of the old index, while the old index is determined to be used in other cases.

* * * * *